US012657170B2

(12) United States Patent　　　(10) Patent No.:　　US 12,657,170 B2

Braun et al.　　　(45) Date of Patent:　　Jun. 16, 2026

(54) COMPUTER-IMPLEMENTED METHOD FOR CONFIGURING A COMPONENT WITH AN OPC UA SERVER IN AN INDUSTRIAL PLANT

(71) Applicant: ABB Schweiz AG, Baden (CH)

(72) Inventors: Roland Braun, Niederkassel Lülsdorf (DE); Mario Hoernicke, Landau (DE); Sten Gruener, Laudenbach (DE); Nafise Eskandani, Rossdorf (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/033,822

(22) Filed: Jan. 22, 2025

(65) Prior Publication Data

US 2025/0238405 A1　　Jul. 24, 2025

(30) Foreign Application Priority Data

Jan. 22, 2024　(EP) ..................................... 24153209

(51) Int. Cl.
　　*G06F 16/21*　　　(2019.01)
　　*G05B 19/05*　　　(2006.01)
(52) U.S. Cl.
　　CPC ............ *G06F 16/211* (2019.01); *G05B 19/05* (2013.01)
(58) Field of Classification Search
　　CPC ... G05B 19/05; G05B 19/4186; G06F 16/211; H04L 67/12
　　USPC ........................................................ 707/803
　　See application file for complete search history.

(56) References Cited

U.S. PATENT DOCUMENTS

| 2020/0210869 A1 | 7/2020 | Anicic et al. | |
| 2023/0384778 A1* | 11/2023 | Mehmedagic ... | G05B 19/41885 |
| 2024/0036537 A1* | 2/2024 | Gupta ................. | H04L 12/2834 |

FOREIGN PATENT DOCUMENTS

| CN | 101405729 A * | 4/2009 | ....... G06F 16/24539 |
| KR | 10-2023-0132142 A | 9/2023 | |

OTHER PUBLICATIONS

FDI: "Field Device Integration (FDI)—Part 8: EDD to OPC-UA Mapping", Date of Circulation: Sep. 10, 2021, International Electrotechnical Commission, IEC. (Year: 2021).*

(Continued)

*Primary Examiner* — Kuen S Lu

(74) *Attorney, Agent, or Firm* — Fitch Even Tabin & Flannery LLP

(57)　　　　　　ABSTRACT

A method for configuring a component includes selecting a Server of the component by a Client of a mapping tool; receiving by the Client a data model that includes a list of attributes; retrieving from a database a list of parameters of the component; retrieving from a dictionary a list of relations between the attributes of the data model and parameters of the component; checking, for each attribute whether the dictionary contains a relation comprising this attribute from the list of relations; for each relation that comprises this attribute, adding, by the mapping tool the relation to a mapping definition file; configuring, by the mapping tool the component by adding, based on the mapping definition file the parameters to the address space of its Server; and reading, by an Client of a control unit the parameters of the component.

9 Claims, 9 Drawing Sheets

(56) References Cited

OTHER PUBLICATIONS

IEC, "Field Device Integration (FDI)—Part 8:EDD to OPC-UA Mapping," Standard, 65E/790/NP, downloaded from the Internet on Jun. 18, 2021, at https://api.iec.ch/harmonized/documents/download/ 1100706, 75 pp. (2021).

Panda et al., "Plug&Produce Integration of Components into OPC UA based data-space," *2018 IEEE 23rd International Conference on Emerging Technologies and Factory Automation (ETFA)*, 1095- 1100 pp. (2018).

Ye et al., "An Industry 4.0 Asset Administration Shell-Enabled Digital Solution for Robot-Based Manufacturing Systems," *IEEE Access*, 9: 154448-154459 (2021).

Zhou et al., "A Unified Asset Management Architecture Based on OPC UA," *2021 China Automation Congress (CAC)*, 7605-7610 pp. (2021).

European Patent Office, Extended European Search Report in European Patent Application No. 24153209.2, 11 pp. (Jul. 5, 2024).

* cited by examiner

Fig. 6b

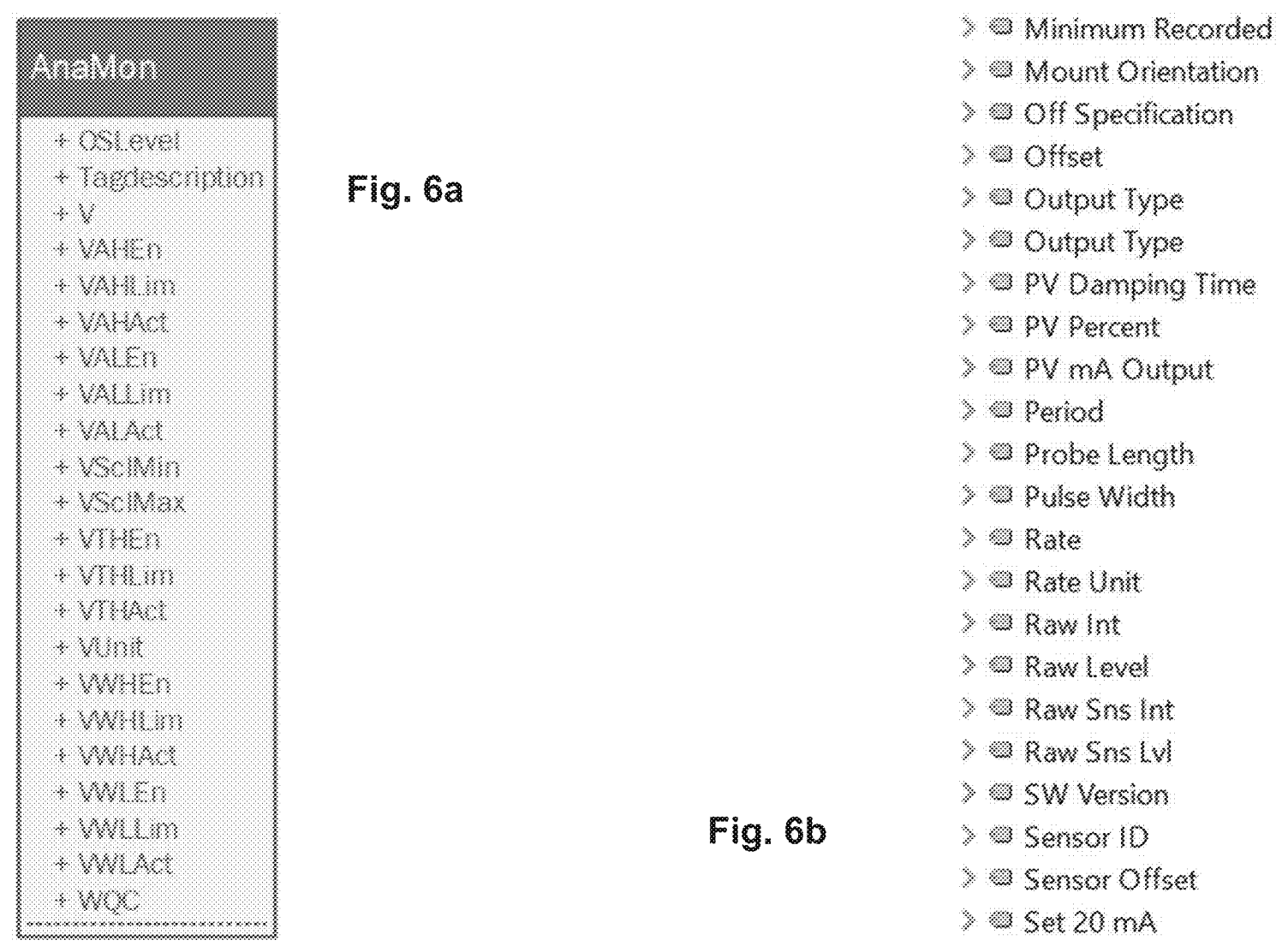

- > Minimum Recorded
- > Mount Orientation
- > Off Specification
- > Offset
- > Output Type
- > Output Type
- > PV Damping Time
- > PV Percent
- > PV mA Output
- > Period
- > Probe Length
- > Pulse Width
- > Rate
- > Rate Unit
- > Raw Int
- > Raw Level
- > Raw Sns Int
- > Raw Sns Lvl
- > SW Version
- > Sensor ID
- > Sensor Offset
- > Set 20 mA

Fig. 6a

AlarmMon
- + CSLevel
- + TagDescription
- + v
- + VAHEn
- + VAHLim
- + VAHAct
- + VALEn
- + VALLim
- + VALAct
- + VSciMin
- + VSciMax
- + VTHEn
- + VTHLim
- + VTHAct
- + VUnit
- + VWHEn
- + VWHLim
- + VWHAct
- + VWLEn
- + VWLLim
- + VWLAct
- + WCo

COMPUTER-IMPLEMENTED METHOD FOR CONFIGURING A COMPONENT WITH AN OPC UA SERVER IN AN INDUSTRIAL PLANT

CROSS-REFERENCE TO RELATED APPLICATIONS

The instant application claims priority to European Patent Application No. 24153209.2, filed Jan. 22, 2024, which is incorporated herein in its entirety by reference.

FIELD OF THE DISCLOSURE

The present disclosure generally relates to controlling an industrial plant or a sub-system of an industrial plant and, more particularly, to controlling an industrial plant comprising components with an OPC UA Server.

BACKGROUND OF THE INVENTION

For controlling an industrial plant, several communication mechanisms, protocols, and/or information models exist. Examples may comprise the so-called OPC UA and other protocols that have, e.g., a "controller's view" on the communication within an industrial plant. Both protocols and information models are well-defined and are widely used. However, at least some communication mechanisms and protocols may not be compatible to each other, so that some effort may be necessary to establish a communication between each other. This may lead to costly and error-prone work for adapting the protocols, whenever a cooperation of two protocols becomes necessary.

BRIEF SUMMARY OF THE INVENTION

The present disclosure generally relates to a method for configuring a component with an OPC UA server in an industrial plant, and to a mapping tool, a use, a program element, and a computer-readable storage medium. The methods described herein reduce the effort of adapting two protocols and/or information models for communicating within an industrial plant.

In one aspect, the present disclosure relates to a computer-implemented method for configuring a component of a sub-system of an industrial plant, the component comprising an OPC UA Server and an OPC UA data model comprising attributes of the component, the method comprising the steps of:

Step 122: selecting, by an OPC UA Client of a mapping tool, the OPC UA Server of the component;

Step 124: receiving, by the OPC UA Client of the mapping tool, from the OPC UA Server of the component, the OPC UA data model of the component, wherein the OPC UA data model comprises a list of attributes;

Step 126: retrieving, by the mapping tool, from an engineering database related to the component, a list of parameters of the component;

Step 128: retrieving, by the mapping tool, from a dictionary in a dictionary database, a list of relations between the attributes of the OPC UA data model and the parameters of the component;

Step 130: checking, by the mapping tool, for each attribute of the list of attributes of the OPC UA data model, if the dictionary contains a relation comprising this attribute from the list of relations;

Step 132: for each relation that comprises this attribute, adding, by the mapping tool, the relation to a mapping definition file;

Step 134: configuring, by the mapping tool, the component by adding, based on the mapping definition file, the parameters to the address space of its OPC UA Server, using an OPC UA ReferenceType HasDictionaryEntry; and Step 136: reading, by an OPC UA Client of a control unit, PLC, the parameters of the component.

BRIEF DESCRIPTION OF THE SEVERAL VIEWS OF THE DRAWING(S)

FIG. 6a is an example of a CDC AnaMon, specified according to VDI 2658 according to an embodiment of the present disclosure.

FIG. 6b is an example or excerpt of an OPC UA Server's address space (OEM Model) for which a mapping shall be defined in accordance with the disclosure.

Figures 7A, 7B, 7C:
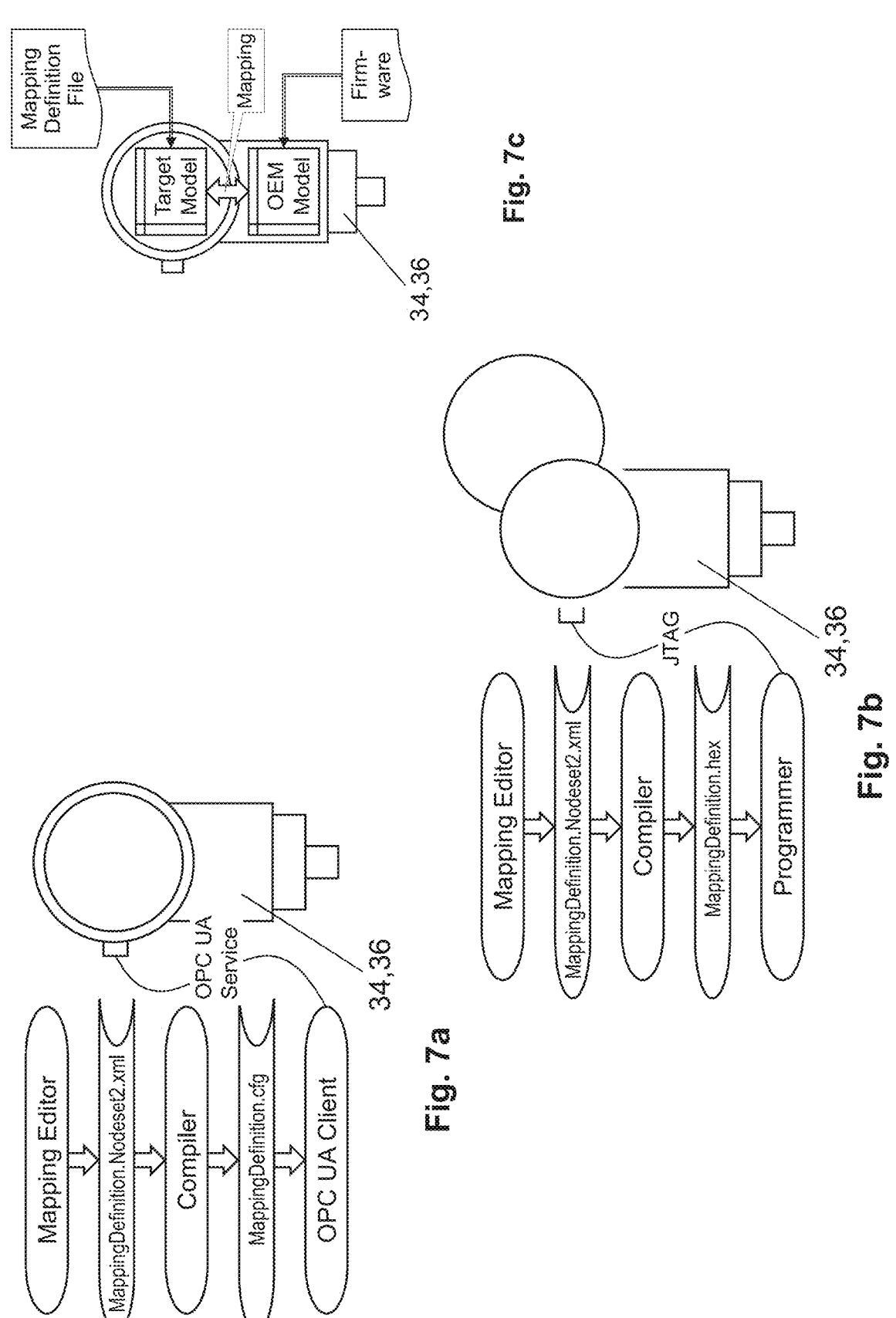

FIGS. 7a, 7b, and 7c are examples of uploading a module to the firmware that extends the OEM defined address space according to an embodiment of the present disclosure.

DETAILED DESCRIPTION OF THE INVENTION

Figure 1:
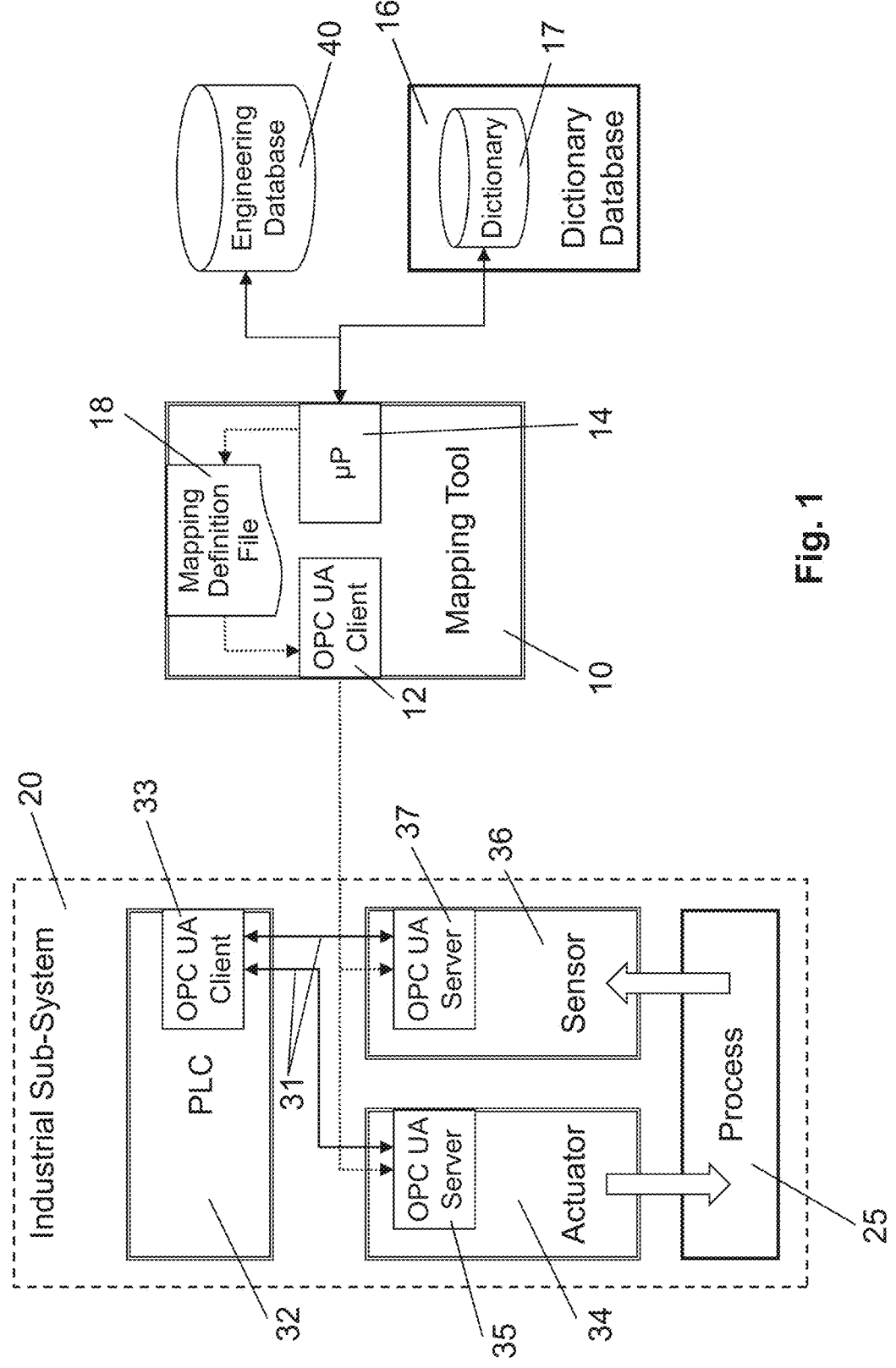
FIG. 1 is a block diagram of an industrial plant in accordance with the disclosure.

FIG. 1 shows schematically a scenario in an industrial plant according to an embodiment. The industrial plant comprises an industrial sub-system 20, comprising at least one control unit, PLC 32, and at least one component, i.e. at least one sensor 36 and/or at least one actuator 34. The components 34, 36 may interact with a process 25 of the industrial sub-system 20. The industrial process may be configured for producing and/or for manufacturing substances, for instance materials and/or compounds. The components 34, 36 may comprise an OPC UA Server 35 and 37, respectively. The PLC 32 may comprise an OPC UA Client 33. The PLC 32 may control the components 34, 36 using OPC UA Services which is represented by control lines 31. For configuring the components 34, 36, the scenario may further comprise a mapping tool 10, which at least comprises a processor (μP 14) and an OPC UA Client 12. The mapping tool 10 may be configured for building a mapping definition file 18. Building the mapping definition file 18 may be configured to access an engineering database 40 and a dictionary database 16. The dictionary database 16 comprises at least one dictionary 17. The dictionary 17 contains a list of relations between at least some of the attributes of the OPC UA data model (aka "OEM Model") of the components 34, 36, and at least some parameters of the components 34, 36, wherein the parameters are related to an engineering database 40. After having built the mapping definition file 18, said mapping definition file 18 may be uploaded to the components 34, 36, thus enabling a mapping between the attributes of the OPC UA data model and the parameters.

Figure 2:
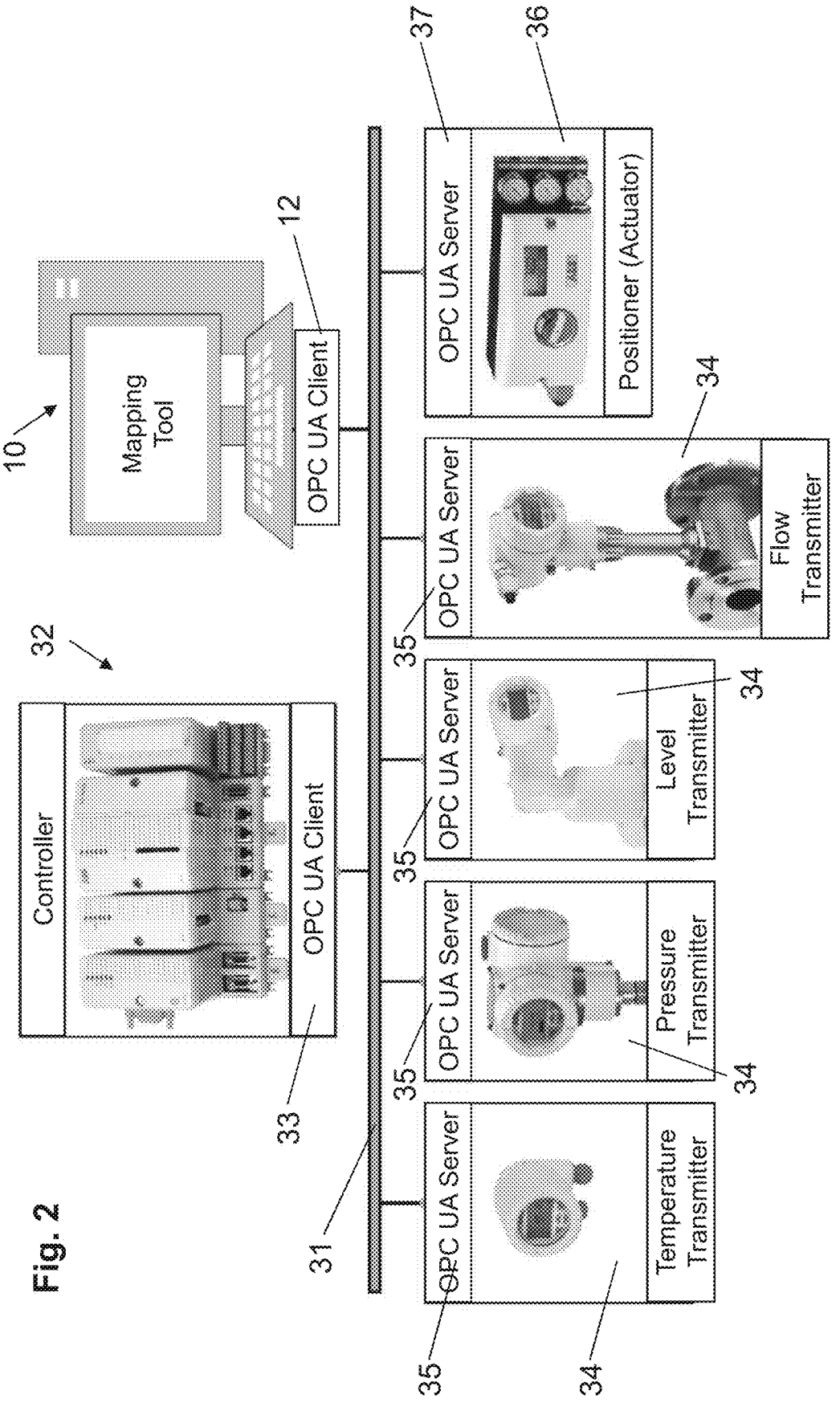
FIG. 2 is a block diagram of an alternative scenario in an industrial plant in accordance with the disclosure.

FIG. 2 shows schematically another scenario in an industrial plant according to an embodiment. Same reference signs as used in FIG. 1 designate same or similar entities. Specifically, FIG. 2 shows examples of components 34, 36. Examples of components 34, which are sensors, comprise a temperature transmitter, a pressure transmitter, and a flow transmitter. Examples of components 36, which are actuators, comprise a positioner. The components 34, 36 are connected, via their OPC UA Servers 35 or 37, respectively, to a communication network represented by control line 31. The control line 31 is shown as a bus (which may represent an Ethernet-based connection), but may have any topology. Furthermore, a PLC 32 is shown, which is also connected, via its OPC UA Client 33, to the control line 31. The PLC 32 may be configured to control the components 34, 36. In addition, a mapping tool 10, which is connected, via its OPC UA Client 12, to the control line 31. The mapping tool 10 may have access to an engineering database 40 and a dictionary database 16 (both not shown), which may be integrated in the computer assembly of the mapping tool 10, and/or may be arranged anywhere outside. Note that the sensors, actuator and control units shown are only for exemplary purposes. In reality, the method described above and/or below is "generic" in a way that it can be a broad variety of sensors, actuators and control units.

Figure 3A:
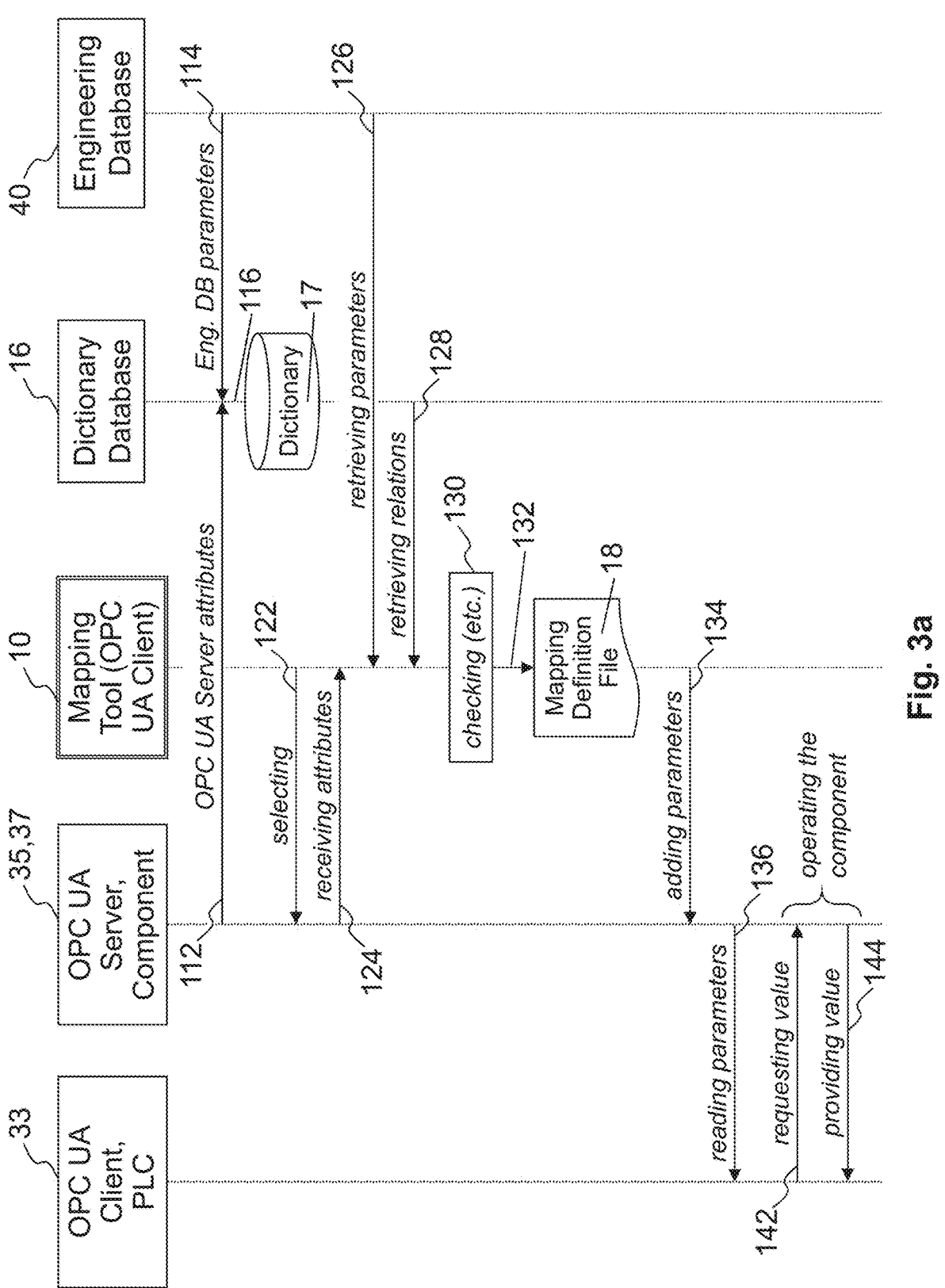
FIGS. 3a and 3b are process flowcharts of a message sequence chart in accordance with the disclosure.
Figure 3B:
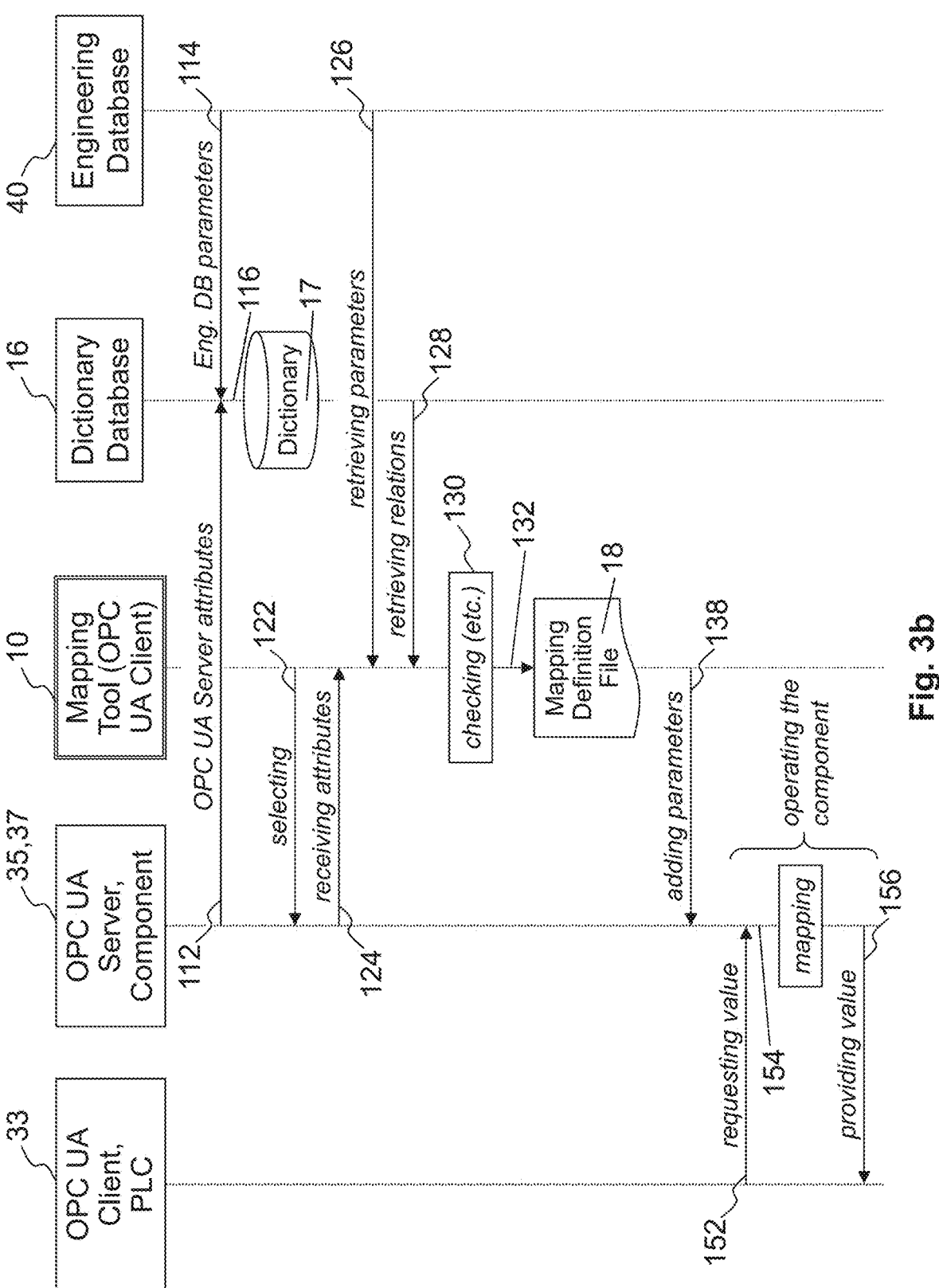

FIGS. 3a and 3b show a message sequence chart according to an embodiment. Particularly, FIG. 3a depicts a computer-implemented method according to an embodiment for configuring a component 34, 36 (see, e.g., FIG. 1) of a sub-system 20 of an industrial plant, the component 34, 36 comprising an OPC UA Server 35, 37 and an OPC UA data model comprising attributes of the component 34, 36. The method comprises a step 112, which comprises requesting attributes of the OPC UA data model of the OPC UA Server 35, 37. In a step 114 parameters of the engineering database 40 are requested. Steps 112 and 114 may be performed in any sequence, e.g. in parallel or one step after the other. In a step 116, a dictionary 17 is built, which comprises the list of relations between at least some of the attributes of the OPC UA data model and at least some parameters of the component 34, 36.

In a step 122, the OPC UA Server 35, 37 of the component 34, 36 is selected by an OPC UA Client 12 of a mapping tool 10. In a step 124, the OPC UA data model of the component 34, 36 is received, by the OPC UA Client 12 of the mapping tool 10, from the OPC UA Server 35, 37 of the component 34, 36. Said OPC UA data model comprises a list of attributes. In a step 126, a list of parameters of the component 34, 36 is retrieved, by the mapping tool 10, from an engineering database 40 related to the component 34, 36. In a step 128, a list of relations between the attributes of the OPC UA data model and the parameters of the component 34, 36 is retrieved by the mapping tool 10, from a dictionary 17 in a dictionary database 16. In a step 130, there is a checking (by the mapping tool 10) for each attribute of the list of attributes of the OPC UA data model, if the dictionary 17 contains a relation comprising this attribute from the list of relations. In a step 132, for each relation that comprises this attribute the relation to a mapping definition file 18 is added (by the mapping tool 10). In a step 134, the component 34, 36 is configured (by the mapping tool 10), by adding, based on the mapping definition file 18, the parameters to the address space of its OPC UA Server 35, 37, using an OPC UA ReferenceType HasDictionaryEntry. In a step 136, the parameters of the component 34, 36 are read by an OPC UA Client 33 of a control unit (PLC) 32.

When operating the component, in a step 142, a value from the component 34, 36 is requested by an OPC UA Client 33 of the PLC 32. In a step 144, the value is provided to the PLC 32 of the sub-system 20, by the OPC Server of the component 34, 36.

FIG. 3b depicts a computer-implemented method according to an embodiment for configuring a component 34, 36 (see, e.g., FIG. 1) of a sub-system 20 of an industrial plant, the component 34, 36 comprising an OPC UA Server 35, 37 and an OPC UA data model comprising attributes of the component 34, 36. Steps 112 to 132 may be similar or the same as the steps 112 to 132 described above (i.e. related to FIG. 3a).

In a step 138, the parameters of the OPC UA Server 35, 37 of the component 34, 36 are configured, by the mapping tool 10, based on the mapping definition file 18, by using an OPC UA ReferenceType CorrespondsTo relation. When operating the component, in a step 152, a value from the component 34, 36 is requested, by an OPC UA Client 33 of a PLC 32. In a step 154, the value is handled, by the component 34, 36, based on the mapping definition file 18. In a step 156, the value is provided to the PLC 32 of the sub-system 20, by the OPC Server of the component 34, 36.

Figure 4:
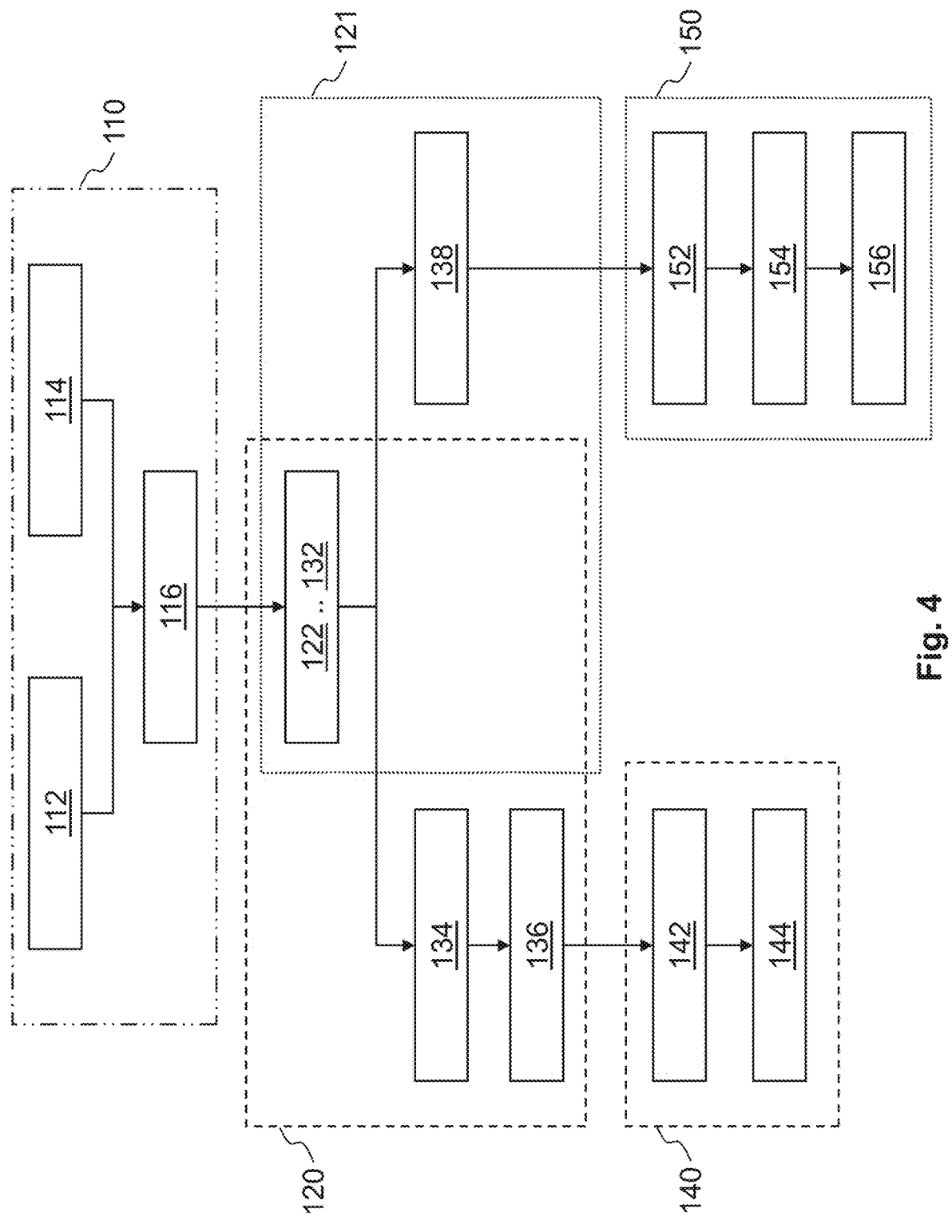
FIG. 4 is a flow diagram for a method in accordance with the disclosure.

FIG. 4 shows a flow diagram according to an embodiment. Same reference signs as used in FIG. 3a and/or FIG. 3b designate same or similar entities. The flow diagram of FIG. 4 comprises several sub-diagrams. Sub-diagram 110 comprises steps 112-116, which relate to a preparation of a dictionary 17 (see, e.g., FIG. 1). Sub-diagram 120 comprises steps 122-136, which relate to configuring a component 34, 36 by using a reference type called HasDictionaryEntry. Sub-diagram 121 comprises steps 122-138, which relate to configuring a component 34, 36 by using a reference type called CorrespondsTo. Sub-diagram 140 comprises steps 142 and 144, which may be used in an industrial sub system using components that have been configured by using a reference type called HasDictionaryEntry. Sub-diagram 150 comprises steps 152-156, which may be used in an industrial sub-system using components that have been configured by using a reference type called CorrespondsTo.

Figure 5A:
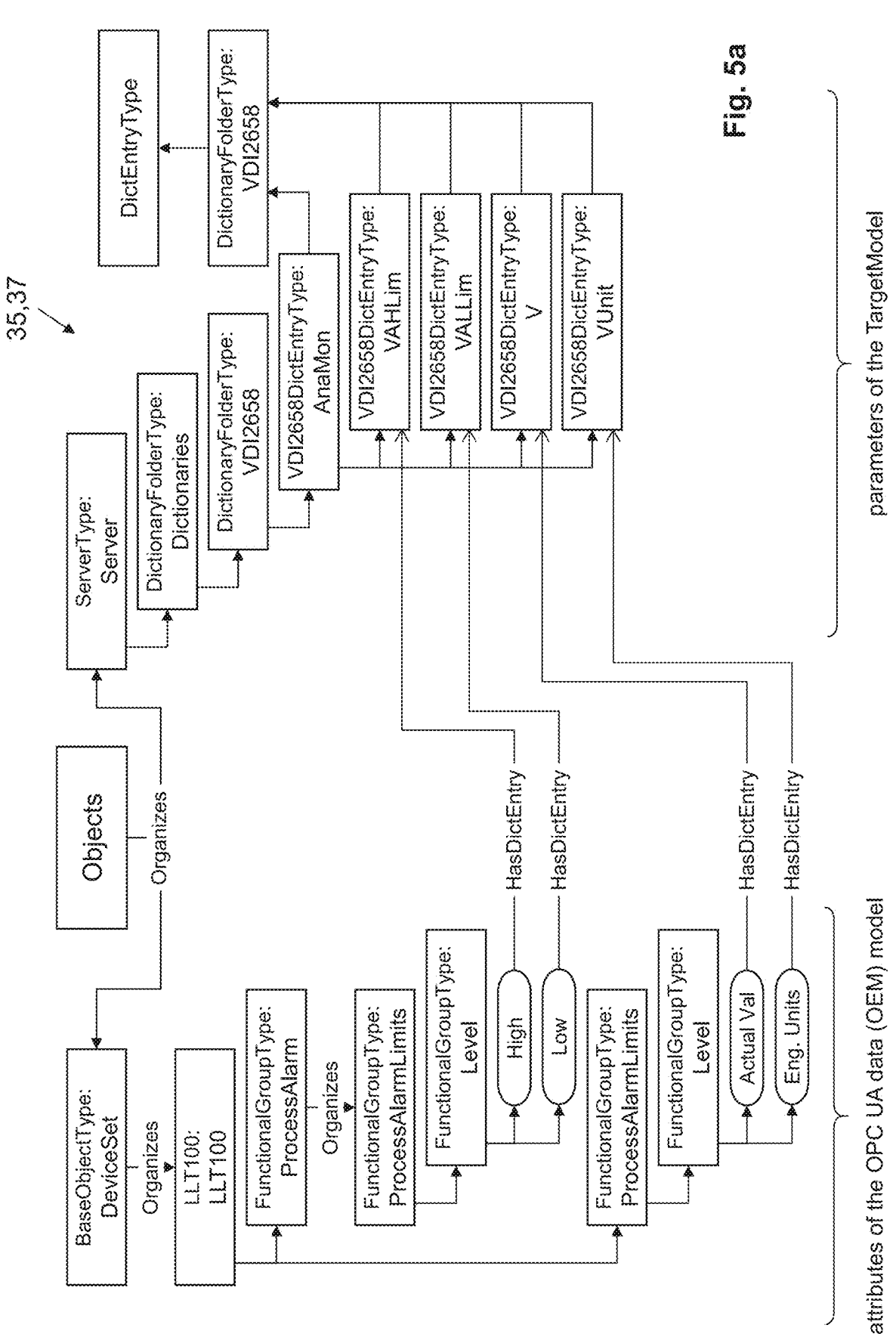
FIGS. 5a and 5b are exemplary diagrams of OPC UA servers in accordance with the disclosure.
Figure 5B:
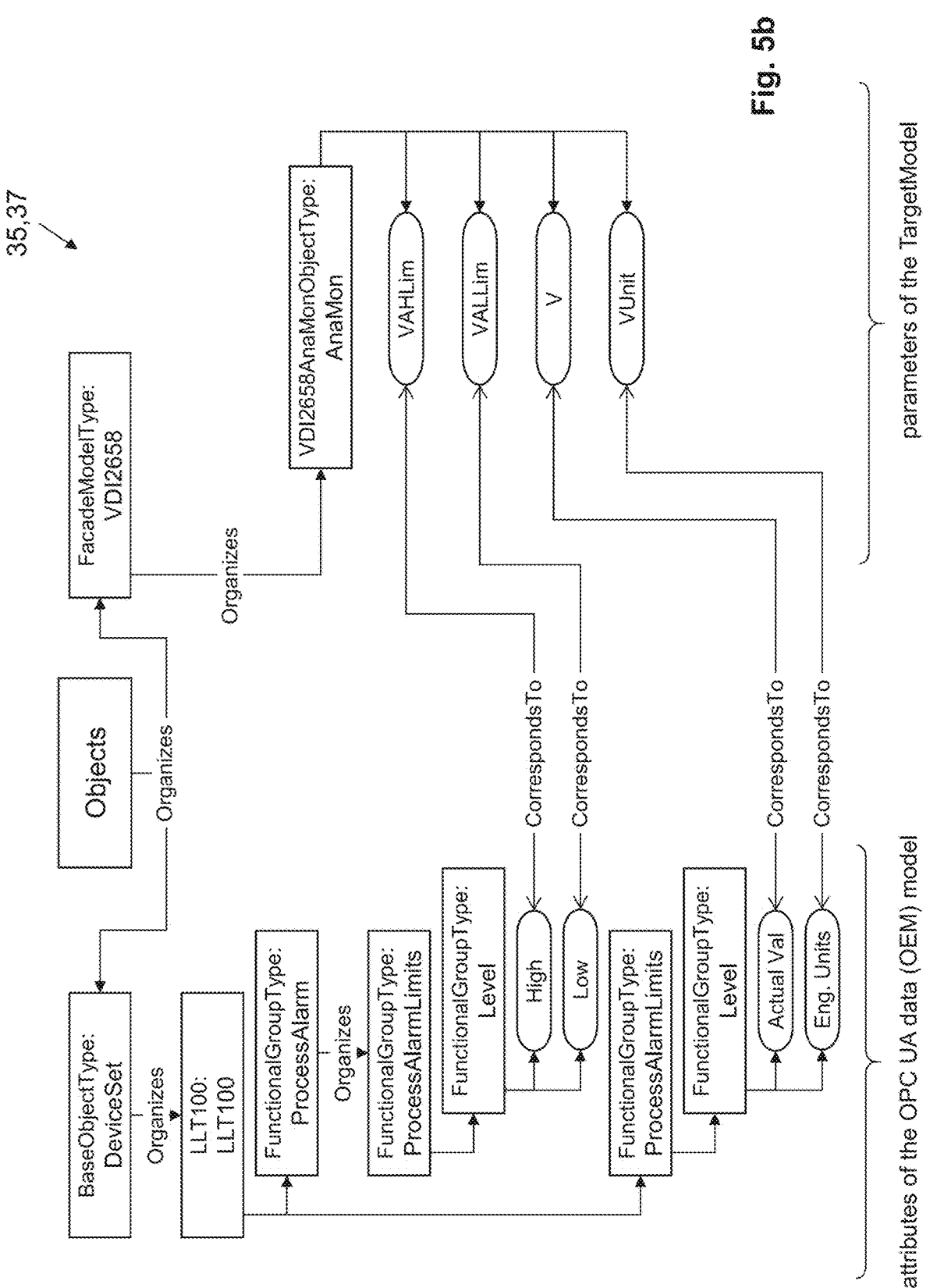

FIGS. 5a and 5b show examples of OPC UA servers of a component 34, 36 according to an embodiment. On the left side of FIGS. 5a and 5b, example attributes of the OPC UA data model are shown. On the right side of FIGS. 5a and 5b, example parameters of the TargetModel are shown. The left side of FIGS. 5a and 5b may have the same semantic like the left side "Attributes of the OPC UA Data Model" (or "OEM model") of Table 1 (see above), and the right side of FIGS. 5a and 5b may have the same semantic like the right side "Parameters of the TargetModel" of Table 1. The examples show standardized parameter values according to VDI 2658. In the figures, the hierarchical structure both of the attributes and the parameters are clearly visible. In FIG. 5a, a result of configuring a component 34, 36 by using a reference type called HasDictionaryEntry is shown. This relation builds a pointer from a description of an attribute value (e.g. the left part of a line in Table 1) to a description of a parameter value (e.g. the right part of a line in Table 1). The "right part" advantageously only exits once, but more than one pointer can point on this, thus reducing the amount of required memory in the component. In FIG. 5b, a result of configuring a component 34, 36 by using a bidirectional reference type called CorrespondsTo is shown. Using the CorrespondsTo relation means that for each attribute entry ("Attributes of the OPC UA Data Model" of Table 1), a parameter entry ("Parameters of the TargetModel" of Table 1) is entered into the address space of the component's OPC UA Server. This advantageously enables the component to perform a mapping "from right part to left part", i.e. from the parameter entry of the TargetModel to the attribute entry of the OPC UA data model of the component.

FIG. 6a shows, as an example, a section of a list of parameters according to an embodiment. The parameters shown are standardized according to VDI 2658 for a generic device called "AnaMon" ("Analog Monitor"). The specification VDI 2658 defines a set of common data classes (CDC) with their set of attributes. The AnaMon list comprises administrative values like the OSLevel, but also values like VSclMin or VSclMax for V→Value (Process/Sensor), Scl→Scale, and Max→Maximum. This list is an example for values of the "TargetModel", i.e. of the bottommost values of the hierarchical list of the "right part" of Table 1.

FIG. 6b shows a list of attributes according to an embodiment, namely an excerpt of the OPC UA Address Space. This list is an example for values of the "OPC UA data model", i.e. the bottom-most values of the hierarchical list of the "left part" of Table 1. This list makes clear that the OPC UA data model is, at least partly, semantically equivalent to the TargetModel, but uses a different structure and different formats.

FIGS. 7a-7c show examples of uploading a module to the firmware that extends the OEM defined address space according to an embodiment. FIG. 7a shows how the mapping definitions are created and uploaded to the device using OPC UA specified services. The small picture inside was chosen to illustrate the TargetModel the component supports after the upload. FIG. 7b shows how the mapping definitions are created an uploaded to the device using a JTAG interface, which is an integral part of the MCU board. This step can be taken during the production of the device. The mapping is built to order. FIG. 7c illustrates the relation between the OEM Model and the TargetModel and how these elements are related to the firmware and the Mapping.

A sub-system of an industrial plant may comprise a complete plant, or only a part of an industrial plant. The sub-system may comprise components like at least one sensor and/or at least one actuator. The sub-system may further comprise one or more control units. Examples for sensors may comprise inductive, capacitive, resistive, and/or optical means, configured, e.g., for sensing pressure, flow, temperature, distance, and/or variations of these measures, e.g. speed, acceleration, etc. Examples for actuators may The computer-implemented method may be executed by any computer, but at least some parts of the method may require a communication connection to at least the components. Likewise, for at least some parts of the method the computer may require an OPC UA Client installed on it. At least some parts of the method may be executed by a so-called "mapping tool", i.e., a computer with an OPC UA Client installed on it and, in addition, computer program product that is able to perform at least parts of the method described above and/or below.

Particularly, in a step 122, the OPC UA Server of the component is selected by the OPC UA Client of a mapping tool. The selection may be done by automated means, e.g. each time when a new component is entered into the sub-system, it may be based on a plan of the sub-system, which identifies the components, and/or by other means, e.g. by a script, by commands in a command-line, by MDNS (aka Bonjour), OPC UA 10000-12 Discovery and Global Services, and/or by further means.

In a step 124, the OPC UA Client of the mapping tool receives the OPC UA data model of the component. The OPC UA data model may also be called OEM Model, DI-Model, OPC 10000-100, PADIM, OPC 30081, and/or otherwise. The OPC UA data model may comprise a list of attributes, e.g. a linear list, a hierarchical list, or another type of list.

In a step 126, the mapping tool (or its OPC UA Client) retrieves a list of parameters of the component, from an engineering database related to the component. The parameters describe the so-called TargetModel (or target model) of the component. The Target Model may comprise a list of parameters, e.g. a linear list, a hierarchical list, or another type of list. The parameters may be provided by engineering database, for instance by a database comprising standardized values like VDI 2658, or another database that describes the component's values in a structured way. Both the "OPC UA data model" and the "target model" are sometimes also referred to as "information models".

In a step 128, the mapping tool retrieves, from a dictionary in a dictionary database, a list of relations between the attributes of the OPC UA data model and the parameters of the component. The dictionary database may comprise one or more dictionaries. In this list of relations, the parameters are related to an engineering database. The list of relations may, for example, look like Table 1.

TABLE 1

| | Two lines of relations in a dictionary database | |
|---|---|---|
| | Attributes of the OPC UA Data Model (aka OEM Model) | Parameters of the TargetModel |
| r[1] | LLT100.ProcessAlarm.ProcessAlarmLimits.Level.Low | VDI2658.AnaMon.VALLim |
| r[2] | LLT100.ProcessAlarm.ProcessAlarmLimits.Level.High | VDI2658.AnaMon.VAHLim | comprise pumps, compressors, vessels or pressure vessels, tanks, heat exchangers, furnaces, fans, cooling towers, valves, etc. Examples for control units may comprise one or more Programmable Logic Controllers, PLCs. In at least some passages of this text, the terms "PLC" and "control unit" are used as synonyms. Each PLC may control at least one actuator, e.g. based on data from at least one sensor. Each one of the components may have an OPC UA Server installed on it. Each one of the control units may have an OPC UA Client installed on it.

The list of relations may be ordered like an array, with array lines "relation r[1], relation r[2], . . . ". Each array line may have a left part (column "Attributes of the OPC UA Data Model" of Table 1), describing attributes of the OPC UA data model, and a right part (column "Parameters of the TargetModel" of Table 1), describing the corresponding parameters are related to an engineering database. In Table 1, a hierarchical list of the attributes is shown in a kind of "normal form", where each entry includes the complete hierarchy. In the example shown, "LLT100" describes a level sensor and its product number, "ProcessAlarm"

describes an ordered set of alarm types, "ProcessAlarm Limits" describes alarms of the alarm type "Limits", "Level" describes that this is about level limits, and "Low" or "High" describes the detailed alarm values, namely "fill level reaching lower limit" or "fill level reaching upper limit", respectively. Each array line may further have a right part, to define a relation. The right part may, in the example shown, describe parameters according to VDI2658. The right part may use a parameter set "AnaMon" ("Analog Monitor") which may describe a list of parameters that are standardized according to VDI2658. The example values are "VALLim" for "fill level reaching lower limit" and "VAHLim" for "fill level reaching upper limit", respectively.

In a step 130, the mapping tool checks, for each attribute of the list of attributes of the OPC UA data model, if the dictionary database contains a relation comprising this attribute from the list of relations. Taking the attribute "LLT100.ProcessAlarm.Process AlarmLimits.Level.High" from Table 1, the mapping tool will find that there exists a corresponding relation "r[2]", with a right side "VDI2658.AnaMon.VAHLim".

In a step 132, the mapping tool builds a mapping definition file. The mapping definition file may be specific for each component, for each type of components, or for each class of components. For each relation in the list of relations that comprises this attribute—i.e. if the left part of the relation is found in the dictionary database —, the respective parameter of the component is added to the attribute of the component in an OPC UA Server. As a result, the mapping definition file contains both the attributes and the corresponding parameters of the component.

In a step 134, the mapping definition file of the component is used for configuring the component. Configuring the component comprises to add, by the mapping tool, based on the mapping definition file, the parameters to the address space of its OPC UA Server, using an OPC UA Reference-Type HasDictionaryEntry. The configuring may comprise uploading, by the mapping tool, the mapping definition file to the OPC UA Server of the component. This Reference-Type builds a pointer from a description of an attribute value (e.g. the left part of a line in Table 1) to a description of a parameter value (e.g. the right part of a line in Table 1). Advantageously, the "right part" only exits once, but more than one point can point on this, thus reducing the amount of required memory in the component. As a result, the OPC UA data model is enriched by the data and/or aspects of the TargetModel.

In a step 136, a PLC (a control unit), which is configured for controlling the component, is "made aware" of the relations of the component's mapping definition file. For this, an OPC UA Client of the PLC reads the parameters of the component. A PLC with an OPC UA Client is able to access the component's OPC UA Server, more specifically: its address space. The PLC knows the concept of the OPC UA Server's address space and is, thus, able to find the "HasDictionaryEntry" relations. Said relations are often designated as "References" (e.g. of an OPC UA Reference-Type). Since the PLC knows the "right parts", it is—after having read the relations of the component—able to address the component by communicating via regular OPC UA communication, i.e. by using the "left parts" of the relations.

This method may reduce—or even avoid—the effort of adapting two protocols and/or information models for communicating within an industrial plant, i.e., for instance, for retrieving measurement (and other) values from a sensor and/or for controlling actions performed by an actuator. As soon as the dictionary database is established, i.e. as soon as it contains all the relations that are relevant for an industrial plant or for a sub-system, the method described above and/or below can be performed automatically. Moreover, the method is "generic" in a way that it can be applied to almost all types of "right parts", which are semantically equivalent to an OPC UA description. And, it is "generic" in a way that it can be applied to a broad variety of components–i.e. to a broad variety of sensor types and/or actuator types—and also to a broad variety of control units.

In various embodiments, the method further comprises following steps, which may be performed when operating the component, e.g. in a productive run in the industrial plant and/or in the sub-system:

In a step 142, the OPC UA Client of the PLC requests a value from the component, e.g. a measurement value, an alarm value, and/or another type of value. This can be done via regular OPC UA communication.

In a step 144, the OPC Server of the component can provide the value to the PLC of the sub-system. This communication can also be done via regular OPC UA communication.

As a result, "both worlds" (OPC UA and, e.g., VDI 2658) of accessing and controlling component in the industrial plant can be used, including all their benefits. And, advantageously no complicated and error-prone manual adaptation or transformation is necessary, because the adaptation can be done by automated means. Furthermore, for the service personnel and/or other persons that run the plant, the communication between the entities of the plant—e.g. components and controllers—will look like a regular OPC UA communication.

One aspect relates to a computer-implemented method for configuring a component of a sub-system of an industrial plant, the component comprising an OPC UA Server and an OPC UA data model comprising attributes of the component. The method comprises the steps 122 to 132 as described above and/or below.

Furthermore, the method comprises a step 138. In the step 138, the mapping tool configures, based on the mapping definition file, the parameters of the OPC UA Server of the component by using an OPC UA ReferenceType CorrespondsTo relation. Using a CorrespondsTo ReferenceType means that for each attribute entry (column "Attributes of the OPC UA Data Model" of Table 1), a parameter entry (column "Parameters of the TargetModel" of Table 1) is entered into the address space of the component's OPC UA Server. This advantageously enables the component to perform a mapping "from right part to left part", i.e. from the parameter entry of the TargetModel to the attribute entry of the OPC UA data model of the component.

Also in this case, "both worlds" of accessing and controlling component in the industrial plant can be used, including all their benefits. And also, there is no complicated manual adaptation or transformation necessary, because the adaptation can be done by automated means.

In various embodiments, the method further comprises following steps, which may be performed when operating the component, e.g. in a productive run in the industrial plant and/or in the sub-system:

In a step 152, an OPC UA Client of the PLC requests a parameter value from the component. The PLC may only know the TargetModel of the component. From the PLC point of view, this may look like using only the TargetModel. The TargetModel request may be performed according to VDI 2658, e.g. by a request, which may be performed according to VDI 2658, e.g. by an OPC UA service that reads or writes a variable like "VDI2658. AnaMon. VAHLim".

After receiving the request, the component handles, in a step 154, the parameter value. When the read request refers to a sensor value, the handling may comprise receiving the value from a sensor frontend. This value is mapped to the corresponding parameter of the TargetModel. In step 156, this value is used to respond to PLC's read request. After receiving a write request that refers to the setpoint of an actuator, the component copies the received value to the corresponding Attribute of the OEM Model, which may comprise sending the value to an acting part, e.g. to a motor, valve, heater, etc. In step 156, the result of this actuation request is converted into the write response, which is sent to the PLC. In short, step 152 relates to a Read or Write request, step 154 relates to a Mapping (possibly bidirectional), and step 156 relates to a Response.

In various embodiments, providing the value to or from the OPC UA Server comprises a conversion between data types of the value. For instance, a value of data type "float" may be converted into an "integer" or "Boolean". For example, a value "1.2 m" may be transformed into "integer: 120 cm", or into "Boolean: upper limit reached".

In various embodiments, the method further comprises steps that relate to a preparation of the dictionary. The preparation steps comprise:

In a step 112, attributes of the OPC UA data model of the OPC UA Server are requested. The request may be performed by a preparation tool. The preparation tool may be executed on the same computer as used for the mapping tool or on a different one. In a step 114, parameters of the engineering database are requested. This may be done before, after or parallel to step 112. In a step 116, a dictionary is built, which comprises the list of relations between at least some of the attributes of the OPC UA data model and at least some parameters of the component.

In various embodiments, retrieving (step 126) a list of parameters of the component, from the engineering database, further comprises retrieving a list of abstract data types of the component. Abstract data types may, e.g. comprise subroutines, data classes and/or their attributes. By this, not only values can be converted and/or used in "both worlds", but also executable code.

Note that the preparation steps may alternatively be done by using different approaches, at least as its results can be used for the steps starting with step 122.

In various embodiments, the engineering database comprises parameters according to VDI 2658 of the component. This enables advantageously to use the well-defined and well-known standard VDI 2658 for being used also in an OPC UA environment.

An aspect relates to a mapping tool, configured to for conducting a method of any one of the preceding claims. The mapping tool may, at least for performing some parts of the method, comprise an OPC UA Client.

An aspect relates to a use of a mapping tool according as described above and/or below for configuring a component of a sub-system of an industrial plant.

An aspect relates to a computer program product comprising instructions, which, when executed by a computer on a mapping tool as described above and/or below, cause the computer and/or controller to carry out the method of any one of the preceding claims.

An aspect relates to a computer-readable storage medium where a computer program or a computer program product as described above is stored on.

In other words, current field devices (components) implement in at least some cases a standardized information model according to an OPC UA Foundation registered companion standard. (DI-Model aka OPC 10000-100, PADIM aka OPC 30081, etc.). By this, a model aware OPC UA Client has the business logic to understand the data model of such device. In at least some projects, an engineering tool may be used, which refers to a standard VDI 2658. This engineering tool is about creating process automation solutions based on the modular approach specified in VDI 2658. This approach envisions an information model providing the data abstraction for all components that are needed to create an automation solution for process industries. This abstraction may be implemented in so-called "Common Data Classes" (CDC); cf, e.g., the examples shown in FIG. 6a. Since components, such as sensors and/or actuators, are used in modules of automation solutions, one can find a CDC that corresponds to the function of an instrumentation device (aka Field Device or component). As an example, a temperature transmitter (sensor) may be represented by means of a VDI 2658 specified AnaMon ("Analog Monitor"). However, even if an instrument with OPC UA connectivity implements one of the standardized information models, the integration of an instrument into the VDI 2658 related automation solution may require considerable manual mapping effort. This is because the model of an instrument and a CDC is only similar and potentially semantically equivalent, but not same. Furthermore, the PADIM model defines only a "framework" to describe signals of the field device, e.g. based on NE 131 (see, for instance, reference.opcfoundation.org/PADIM/v100/docs/ 8.3). As of today, only an engineer can define and/or implement a mapping between the parameters of an instrument and the attributes of a CDC. This requires expert's knowledge about the parameters' semantics. And, although OPC UA envisions the means to support the representation of semantic information, one cannot take it for granted that the actual implementation of a data model (OPC UA— address space) will make use of these opportunities.

To support a better understanding of what is found in the address-space of an instrument's OPC UA Server, the PADIM model makes use of the OPC UA specified concept of a dictionary. This may enable an automated interpretation of data found in the address space, however, with focus on ECLASS/CDD IRDIs specified semantics this does not help with the mapping on CDC defined attributes. Additionally, the understanding of a single parameter's semantic may not describe the functional coherence that exists between the attributes of a CDC. A device can implement the modular concept as defined by the DI-Model. If a device implements multiple instances of a variety of CDC, the dictionary approach adding semantics may not be sufficient. A proper mapping needs to consider functional coherence of attributes inside a CDC as well. Additionally, a single measurement function of device can be represented through a variance of similar CDCs (Example AnaMon/AnaView).

Based on type-based infrastructure, the target model may represent a mapping of a vendor/device-specific model by simply setting a reference between a variable of the target model and any variable of the device-specific model. Elements in this solution may comprise:

(i) A known (i.e. easy to find) root node exists, where an OPC UA Client can start browsing the target model. Referring the VDI 2658 example, here the OPC UA Client find all instances of CDCs that are implemented by the device's OPC UA Server. Example: If the device has got two sensors it's OPC UA Server will represent two instances of CDC AnaMon.

(ii) It may not be relevant what information model the device has implemented before the proposed solution is added. The use of a predefined reference, e.g. the reference "CorrespondsTo", may be sufficient.

(iii) During runtime, the OPC UA Server may synchronize the values of the variables that are connected, e.g. by means of a predefined reference "CorrespondsTo". This includes the conversion between data types.

An alternative may be to create a VDI-based façade model on top of existing PADIM information structure would be to use the so-called HasDictionaryEntry references, as defined by OPC UA. The PADIM model has already some references to the IRDI space of CDD describing NE131 core. Additionally, a dictionary may be added that represents the VDI 2658 specified common data classes and their attributes. Multi-dictionary systems are described in OPC UA part 19. This approach can be easily applied to add VDI 2658-CDC specific mappings to any address space. The extension will be found in the device firmware.

As of today, many devices may be prepared for integration into industrial systems that run on VDI 2658. However, there are other standards VDI 2658, and further are to come. Therefore, it may be advantageous to support a "generic" mapping, which is ready for another information model that is to be supported by the device. While such embedded applications run with constrained resources the solution envisions the concept of a post-production step. Here the mapping is uploaded according to a customer's order. Essentially this step is like uploading a module to the firmware that extends the OEM defined address space.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

10 mapping tool
12 mapping tool's OPC UA Client
14 microprocessor
16 dictionary database
18 mapping definition file
20 industrial sub-system
25 industrial process
31 control lines
32 control unit, e.g. PLC
33 PLC's OPC UA Client
34 actuator
35 actuator's OPC UA Server
36 sensor
37 sensor's OPC UA server
39 communication mapping tool—components
40 Engineering Database
110, 120, 121, 140, 150 sub-diagrams
112-156 steps

What is claimed is:

1. A computer-implemented method for configuring a component of a sub-system of an industrial plant, the component comprising an open platform communications unified architecture (OPC UA) Server and an OPC UA data model comprising attributes of the component, the method comprising:

selecting, by an OPC UA Client of a mapping tool, the OPC UA Server of the component;

receiving, by the OPC UA Client of the mapping tool, from the OPC UA Server of the component, the OPC UA data model of the component, wherein the OPC UA data model comprises a list of attributes;

retrieving, by the mapping tool, from an engineering database related to the component, a list of parameters of the component, the parameters being described according to a second standard that is different from OPC UA;

retrieving, by the mapping tool, from a dictionary in a dictionary database, a list of relations between the attributes of the OPC UA data model and the parameters of the component;

checking, by the mapping tool, for each attribute of the list of attributes of the OPC UA data model, whether the dictionary contains a relation comprising this attribute from the list of relations;

for each relation that comprises this attribute, adding, by the mapping tool, the relation to a mapping definition file;

configuring, by the mapping tool, the component by adding, based on the mapping definition file, the parameters to an address space of its OPC UA Server, using an OPC UA ReferenceType HasDictionaryEntry; and reading, by an OPC UA Client of a programmable logic controller (PLC), the parameters of the component.

2. The computer-implemented method of claim 1, further comprising requesting, by an OPC UA Client of the PLC, a value from the component; and providing, by the OPC Server of the component, the value to the PLC of the sub-system.

3. The method of claim 1, further comprising requesting attributes of the OPC UA data model of the OPC UA Server; requesting parameters of the engineering database; and building a dictionary comprising the list of relations between at least some of the attributes of the OPC UA data model and at least some parameters of the component.

4. The method of claim 1, wherein retrieving a list of parameters of the component from the engineering database further comprises retrieving a list of abstract data types of the component.

5. The method of claim 1, wherein the engineering database comprises parameters according to the second standard, and the second standard is VDI 2658.

6. A computer-implemented method for configuring a component of a sub-system of an industrial plant, the component comprising an open platform communications unified architecture (OPC UA) Server and an OPC UA data model comprising attributes of the component, the method comprising:

selecting, by an OPC UA Client of a mapping tool, the OPC UA Server of the component;

receiving, by the OPC UA Client of the mapping tool, from the OPC UA Server of the component, the OPC UA data model of the component, wherein the OPC UA data model comprises a list of attributes;

retrieving, by the mapping tool, from an engineering database related to the component, a list of parameters of the component, the parameters being described according to a second standard that is different from OPC UA;

retrieving, by the mapping tool, from a dictionary in a dictionary database, a list of relations between the attributes of the OPC UA data model and the parameters of the component;

checking, by the mapping tool, for each attribute of the list of attributes of the OPC UA data model, whether the dictionary contains a relation comprising this attribute from the list of relations;

for each relation that comprises this attribute, adding, by the mapping tool, the relation to a mapping definition file; and configuring, by the mapping tool, based on the mapping definition file, the parameters of the OPC UA Server of the component by using an OPC UA ReferenceType CorrespondsTo relation.

7. The computer-implemented method of claim 6, further comprising:

requesting, by an OPC UA Client of a programmable logic controller (PLC), a value from the component;

handling, by the component, based on the mapping definition file, the value; and providing, by the OPC Server of the component, the value to the PLC of the sub-system.

8. The method of claim 7, wherein providing the value to or from the OPC UA Server comprises converting the value between data types.

9. A mapping tool, configured for carrying out a method for configuring a component of a sub system of an industrial plant, the component comprising an open platform communications unified architecture (OPC UA) Server and an OPC UA data model comprising attributes of the component, the method comprising:

selecting, by an OPC UA Client of a mapping tool, the OPC UA Server of the component;

receiving, by the OPC UA Client of the mapping tool, from the OPC UA Server of the component, the OPC UA data model of the component, wherein the OPC UA data model comprises a list of attributes;

retrieving, by the mapping tool, from an engineering database related to the component, a list of parameters of the component, the parameters being described according to a second standard that is different from OPC UA;

retrieving, by the mapping tool, from a dictionary in a dictionary database, a list of relations between the attributes of the OPC UA data model and the parameters of the component;

checking, by the mapping tool, for each attribute of the list of attributes of the OPC UA data model, whether the dictionary contains a relation comprising this attribute from the list of relations;

for each relation that comprises this attribute, adding, by the mapping tool, the relation to a mapping definition file;

configuring, by the mapping tool, the component by adding, based on the mapping definition file, the parameters to an address space of its OPC UA Server, using an OPC UA ReferenceType HasDictionaryEntry; and wherein the component is operated and during operating of the component, reading, by an OPC UA Client of a programmable logic controller (PLC), the parameters of the component.

* * * * *